(12) United States Patent
Felten (10) Patent No.: US 6,758,930 B1
(45) Date of Patent: Jul. 6, 2004

(54) PROCESS AND APPARATUS FOR TIRE MANUFACTURING WITH OPTIMIZED BEAD POSITIONING

(75) Inventor: Gilbert Alphonse Felten, Luxembourg (LU)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/129,412
(22) PCT Filed: Nov. 18, 1999
(86) PCT No.: PCT/US99/27373
§ 371 (c)(1),
(2), (4) Date: May 2, 2002
(87) PCT Pub. No.: WO01/36186
PCT Pub. Date: May 25, 2001

(51) Int. Cl.[7] .................... B29D 30/26; B29D 30/32
(52) U.S. Cl. .................. 156/111; 156/131; 156/132; 156/133; 156/135; 156/396; 156/406.2; 156/414; 156/417
(58) Field of Search ................. 156/111, 131, 156/132, 133, 135, 39.6, 398–403, 406.2, 414–417

(56) References Cited

U.S. PATENT DOCUMENTS

| | | |
|---|---|---|
| 4,007,080 A | 2/1977 | Klopper |
| 4,190,482 A | 2/1980 | Yabe |
| 4,634,489 A * | 1/1987 | Dupommier ............... 156/403 |
| 4,684,422 A * | 8/1987 | Roedseth ................. 156/126 |
| 4,685,992 A * | 8/1987 | Irie ........................ 156/396 |
| 5,215,612 A | 6/1993 | Motomura et al. |

FOREIGN PATENT DOCUMENTS

| | | |
|---|---|---|
| DE | 42 19 035 | 12/1992 |
| EP | 0385110 | 9/1990 |
| EP | 0394554 | 10/1990 |
| EP | 0449587 | 10/1991 |
| FR | 1519771 | 2/1968 |

* cited by examiner

Primary Examiner—Geoffrey L. Knable
(74) Attorney, Agent, or Firm—Howard M. Cohn

(57) ABSTRACT

A method and system for building, in at least two stages, an unvulcanized tire carcass (30). The system (20) incorporates a first stage tire building drum (22) on which predetermined, unvulcanized tire building components are layered to form a cylindrically shaped, unvulcanized tire carcass (30), a second stage shaping drum (24) on which the carcass (30) is shaped into a shape suitable for subsequent molding and vulcanization, and a bead tube transfer device (28) that positions tire beads (32a, 32b) on the carcass (30) that is built up on the first stage drum (22) and then transfer the tire carcass (30) and its tire beads between the first and second stage drums while precisely maintaining the axial separation distance between the beads.

14 Claims, 5 Drawing Sheets

PROCESS AND APPARATUS FOR TIRE MANUFACTURING WITH OPTIMIZED BEAD POSITIONING

TECHNICAL FIELD

This invention relates to tire building methods and apparatus. More particularly, the invention relates to a two stage tire building system, which is used, for example, in the building of radial tires having more uniform tire cord lengths.

BACKGROUND OF THE INVENTION

A typical two stage tire building system employs a first stage, cylindrical, tire building drum on which is formed a cylindrical tire carcass from layered unvulcanized components of the tire, such as an inner liner and one or more carcass plies, plus flippers or chippers that may be desired in the area of the tire beads. The cylindrical tire carcass is then removed from the first stage tire building drum and transported to a second stage, expandable tire building drum where the carcass is expanded into a toroidal shape for receipt of the remaining components of the tire, such as sidewalls, the unvulcanized tread and reinforcement belts. The completed, toroidally shaped unvulcanized tire carcass is then removed from the second stage drum and subsequently molded and vulcanized into a finished radial tire.

In a well known two stage system, the tire beads with attached unvulcanized rubber apexes are positioned in spaced, unattached surrounding relation around the unvulcanized, cylindrical tire carcass which was built on a first stage cylindrical tire building drum. The tire carcass is lifted off the first stage solid drum by means of suction cups which grab and hold the carcass. The carcass and the unattached tire beads are then transported axially to the expandable second stage tire shaping drum, which is coaxially aligned with the first stage tire building drum.

On the second stage drum, the opposing ends of the tire carcass are turned up around the tire beads to fix their maximum axial separation distance. Then, the tire carcass is expanded into a toroidal shape; this action also serving to limit the beads' minimum axial separation distance. A belt and tread structure is applied centrally around the tire carcass having a toroidal shape to complete formation of an unvulcanized tire carcass which is suitable for molding and vulcanization.

In these prior art tire building systems, a problem arises in precisely locating and anchoring the tire beads on the unvulcanized tire carcass, especially during the transportation of the tire beads from the first stage drum to the second stage drum. It is desired to position the beads so that tires can be built without distortion caused by variations in their positioning.

European Patent Application Publication number 0,449, 587A1 (Oakafuji/Bridgestone Corp., October 1991) discloses a cylindrical member removal and transfer method that utilizes a band removal unit (18) having holding pawls (20) engaged with the bead rings (14), and frustoconical expanding pawls (22) that expand the ends of the cylindrical member (16). The two sets of pawls are used to maintain the shape of the member and the position of the bead rings during transfer from a first stage drum to a second stage drum.

OBJECTS OF THE INVENTION

It is an object of the present invention to provide a two stage tire building system which can be used to build radial tires having more uniform tire cord lengths, as defined in one or more of the appended claims and as such, having the capability of accomplishing one or more of the following subsidiary objects.

An object of the present invention is to provide a method of constructing radial tires having more uniform tire cord lengths.

Still another object of the present invention is provide a tire building method whereby a tire's sidewalls may be applied while the tire carcass is on a first stage, tire building drum; such a method allowing for an easier and more accurate positioning of the sidewalls.

Other objects and advantages of this invention will become readily apparent as the invention is better understood by reference to the accompanying drawings and the detailed description that follows.

SUMMARY OF THE INVENTION

The present invention is a method and system for building, in at least two stages, an unvulcanized tire carcass suitable for molding into a beaded, finished tire having more uniform tire cord lengths, and whereby a tire's sidewalls may be applied while the tire carcass is on a first stage, tire building drum.

In accordance with one preferred embodiment of the present invention, the system is characterized by: (a) a first stage, expandable drum on which unvulcanized tire building components are layered to form a cylindrically shaped, unvulcanized tire carcass; (b) a second stage, shaping drum on which the tire carcass is shaped into a shape suitable for subsequent molding and vulcanization; and (c) a bead tube transfer device that loads and positions beads on the tire carcass that is built up on the first stage drum and then transfers the tire carcass and its beads between the first and second stage drums while precisely maintaining the axial separation distance between the carcass' beads.

In this preferred embodiment, on each end of the first stage drum there is attached an inflatable bladder, which upon inflation serves to turn up the adjoining carcass distal end. Additionally, the bead tube transfer device holds the ends of the carcass in a turned up position during the transfer between the first and second stage drums to allow the carcass and its beads to be clamped by shaping drum bead clamp segments such that the beads' axial separation distance on the second stage, shaping drum is substantially the same as that set on the first stage drum.

In another preferred embodiment, the first stage drum further has on each of its ends a retractable end bell that covers the inflatable bladders while the unvulcanized components are being built up and layered onto the drum. The end bells are mounted so as to allow for axial, retracting motion which serves to fully expose the inflatable bladders so that they may operate to turn up the carcass ends.

Additionally, the second stage drum has inner and outer inflatable bladders that are mounted on outer shaping drum surfaces and proximate the bead clamping segments. When inflated, the inflatable bladders work in conjunction with the bead clamping segments to prevent a tire's beads from moving and becoming misaligned during the tire building operations of the second stage shaping drum.

Further, the bead tube transfer device has at least two, main support rings configured and oriented to encompass the ends of a tire carcass. These support rings are mounted so that their axial separation distance can be varied. This device also has bead tube flanges mounted on the rings, the bead tube flanges having a perforated outer surface and configured so that a portion of the perforated surface comes into contact with the turned up, distal ends of the carcass. The perforations allow a vacuum to be imposed on a portion of the bead tube flange outer surface so as to aid in maintaining the ends of the carcass in a turned up position.

The bead tube transfer device further has at least two vacuum rings oriented outside of and approximately parallel to the main support rings. These vacuum rings are configured to encompass the ends of a tire carcass. They impose a vacuum on a portion of the carcass turned up ends so as to aid in maintaining the ends of the carcass in a turned up position. Additionally, the bead tube flange outer surfaces have magnets mounted on them for holding the beads next to the flanges.

In another preferred embodiment, the bead tube transfer device further includes a bead centering and loading device for placing beads on a tire carcass.

In another preferred embodiment, the present invention takes the form of a method for building, in at least two stages, an unvulcanized tire carcass and bead assembly suitable for molding into a finished tire. The method comprises the steps of; (a) layering unvulcanized tire building components on a first stage, expandable drum to form a cylindrically shaped, unvulcanized tire carcass; (b) placing a pair of tire beads in parallel relation around the first stage drum in spaced relation from the cylindrical tire carcass thereon, such that the ends of the tire carcass extend laterally beyond the tire beads; (c) expanding radially the first stage drum and the tire carcass thereon into engagement with the tire beads, and at least partially turning up the tire carcass ends around the tire beads to at least partially fix and lock the beads to the tire carcass; (d) transferring with a bead tube transfer device the tire beads and engaged tire carcass having at least partially turned up ends from the first stage drum to a second stage shaping drum having radially extendible, bead clamping segments, the bead tube transfer device having the capability to precisely maintain the bead axial separation distance during the transfer and positioning of the beads and engaged carcass onto the second stage drum; (e) clamping, with the second stage drum's bead clamping segments, the beads to the carcass so as to precisely maintain on the second stage drum the bead axial spacing initially fixed on the first stage drum; and (f) shaping the carcass on the second stage drum and completing other predetermined second stage operations, such as completion of turning up the tire carcass distal ends so that the tire carcass ends clamp and lock the beads, applying a belt and tread structure to the tire carcass.

The preferred embodiments of the system and method so described are seen to provide the capability for the unvulcanized tire building components for use on the first stage drum to include a pair of sidewalls.

BRIEF DESCRIPTION OF THE DRAWINGS

The following description of the invention will be better understood by reference to the accompanying drawings, wherein.

DETAILED DESCRIPTION OF THE INVENTION

With general reference to FIGS. 1 through 12, there is shown a schematic illustration of a two stage tire building system 20 for building an unvulcanized tire carcass that is suitable for molding into a radial tire. The tire building system 20 generally includes two stages having a solid, expandable band/carcass, first stage drum 22 and a bladder-type, second stage shaping drum 24, equipped with shoulder-type bead clamps 82.

Figure 1:
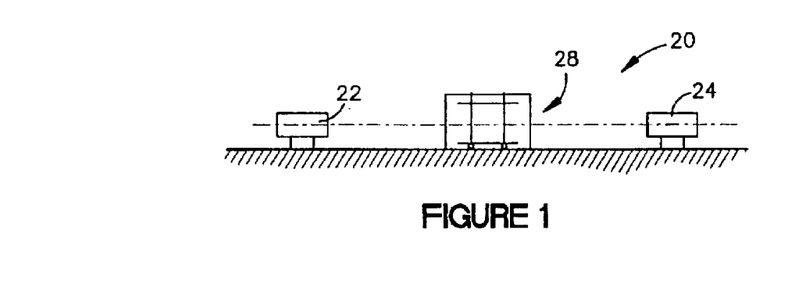
FIG. 1 is a schematic drawing of a two stage, tire building system for building an unvulcanized, toroidally shaped tire carcass suitable for molding into a radial tire.

The stages are linked together by a bead tube transfer device 28 that serves to transfer a tire carcass 30 between the first and second stage drums 22,24, respectively. This bead tube transfer device 28 serves many purposes, including: precisely locating tire bead assemblies 32a and 32b; providing support for the bead assemblies against which carcass ends 34a and 34b are folded up and over, even those edges having attached sidewalls 36; and registering the tire beads 32a,32b when the carcass 30 is placed on the second stage shaping drum 24.

Design of the first and second stage drums 22, 24 has been optimized to achieve, in combination with the bead tube transfer device 28, optimal precision in locating the bead assemblies 32a,32b with respect to the first stage drum and maintaining them in their set positions during the second stage shaping and component application operations of a tire building process.

The carcass components are applied in the first stage while the band/carcass first stage drum 22 is in its collapsed position so as to provide a smooth, solid surface on which to assemble the carcass components.

Figure 3:
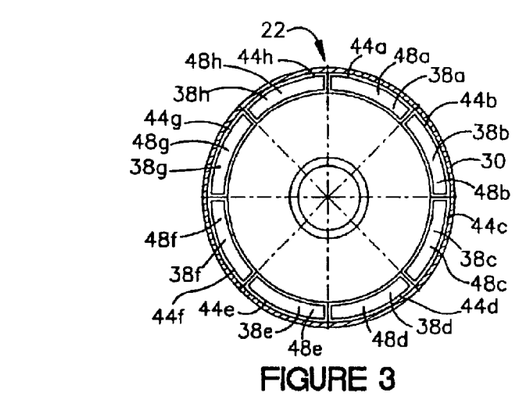
FIG. 3 is a view through line 3—3 3 of FIG. 2 showing a transverse cross section of a portion of the assembly.

As shown in FIG. 3, the band/carcass first stage drum 22 is made up of a multitude of solid, longitudinal segments 38a, 38b, ... 38h (38a–38h) that can be moved radially out (expanded) or in (collapsed) by the action of pistons (not shown) located proximate the centerline A–A of the drum 22.

Figure 2:
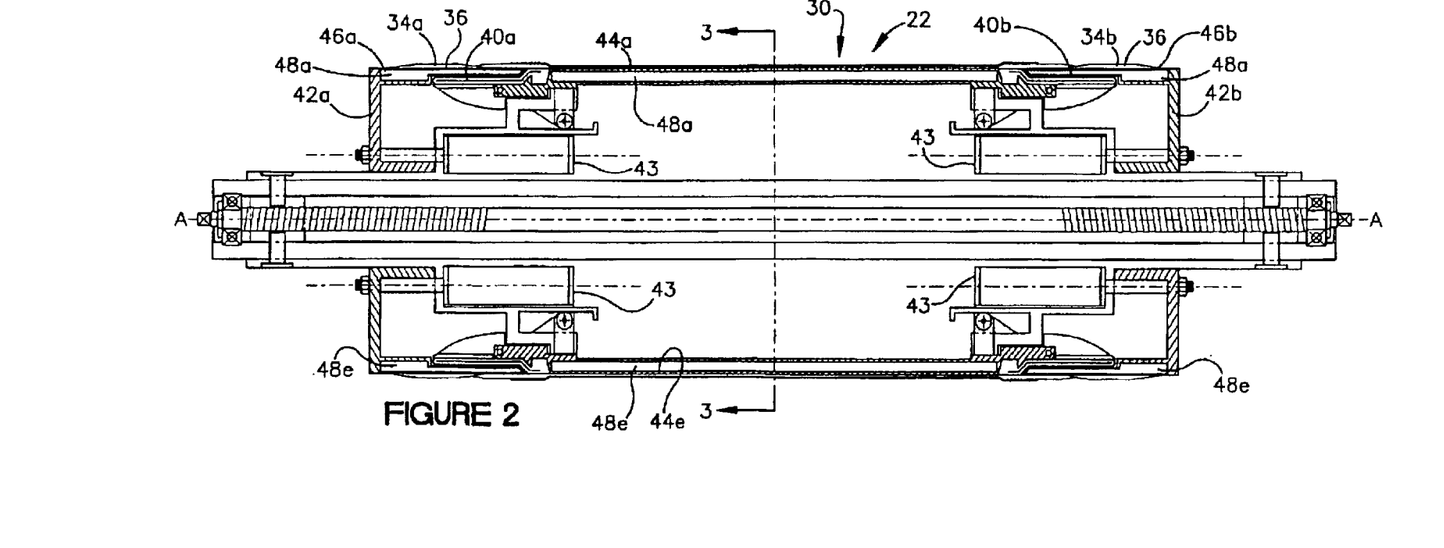
FIG. 2 is a longitudinal cross section of an assembly of a first stage, tire building drum and unvulcanized tire components thereon.

As shown in FIG. 2, each of these segments 38a–38h have attached to their ends turn-up bladders 40a,40b which when inflated served to turn up the carcass ends 34a,34b, respectively. The first stage drum 22 also is equipped on each end with a retractable end bell 42a,42b, each of which is operated by an air cylinder 43. The end bells 42a,42b are arranged, as shown in FIG. 2, to cover the turn-up bladders 40a, 40b, respectively, and to provide a smooth cylindrical surface upon which can be laid up the unvulcanized tire components used to build a tire carcass 30. After the tire components are laid up on the first stage drum 22, a pair of bead assemblies 32a,32b are put in place as described below and the end bells 42a,42b move axially outward to uncover turn-up bladders 40a,40b. After the bladders 40a,40b turn up the ends 34a–34h of carcass 30, the end bells 42a,42b move axially inward and function to aid in the turning-up function of the bladders 40a,40b. Both the segment outer surfaces 44a–44h and the end bell outer surfaces 46a,46b that come into contact with the tire carcass are perforated (not shown) and connected to channels 48a–48h which draw a vacuum or direct air pressure on the outer surfaces 44a–44b,46a,46b for either holding the tire carcass 30 against the drum 22 or blowing the tire carcass off the surfaces of the drum. The air pressure can also be used to form an air cushion between the outer surfaces 48a–48h of the segments 38a–38h, respectively, and the carcass 30 when the drum 22 is expanded, thereby reducing uneven carcass stretching which would otherwise occur at the intersections between the segments 38a–38h.

During the building of the tire carcass 30 on the first stage drum 22, the tire components, such as an inner-liner, one or more carcass plies and a pair of sidewalls 36 and chippers and/or flippers, are applied to the band/carcass first stage drum 22 while the drum is collapsed, with the end bells 42a,42b covering the turn-up bladders 40a,40b and with a vacuum being applied drawn through to the segments 38a–38h and the end bells 42a,42b.

Figure 4:
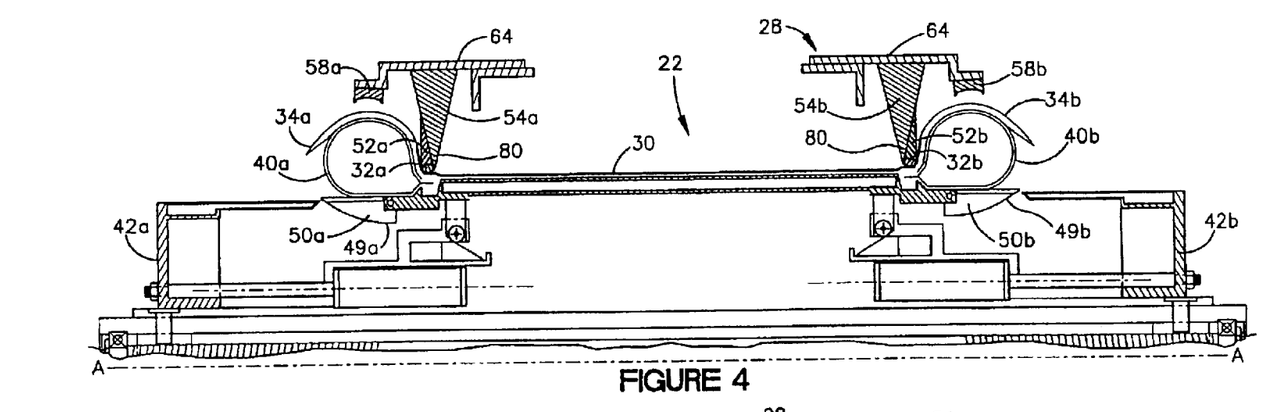
FIG. 4 is a longitudinal cross section of a portion of the assembly of the tire carcass, bead tube transfer device and the first stage drum and tire components layered thereon, with the turn-up bladders inflated.

As shown in FIG. 4, after the tire carcass 30 is built on the first stage drum 22, the bead tube transfer device 28 is used to position the bead assemblies 32a,32b, to encircle each end 34a,34b, respectively, of the carcass, with the beads being spaced apart a specified uniform, axial distance. The end bells 42a,42b are then retracted in opposite axial directions along center line A—A to uncover the turn-up bladders 40a,40b. Next, the segments 38a–38h of the drum 22 are expanded to press circumferential sections of the carcass 30 into contact with the bead assemblies 32a,32b, thereby clamping the bead assemblies to the carcass 30. Continuing inflation of the turn-up bladders 40a, 40b begins to fold the carcass ends 34a,34b around the beads 32a,32b.

Figure 5:
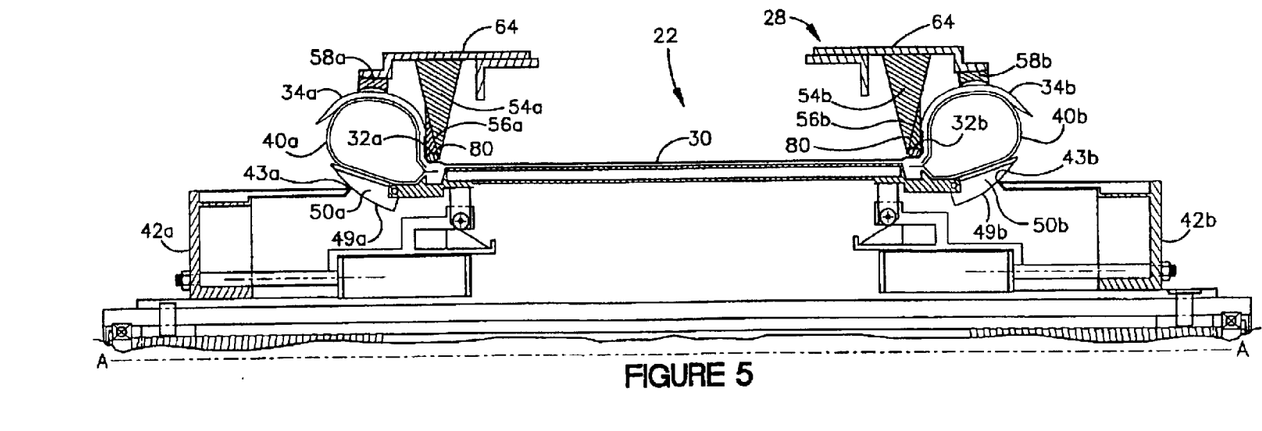
FIG. 5 is a section similar to that of FIG. 4, showing the turn up portions of the tire carcass held in partially turned up relation by the action of radial vacuum rings, especially during the transfer of the tire carcass to the second stage tire shaping drum.

As shown in FIG. 5, the end bells 42a,42b are moved axially toward each other while the drum segments 38a–38h are in their expanded position. The end bells 42a,42b act to push on cambered surface 49a,49b elements 50a,50b, respectively, pivotally attached to the opposite ends of segments 38a–38h on which the bladders 40a,40b are mounted. This pushing action forces the flat surface of the elements 50a,50b which engage the turnup bladders 40a,40b to fold the carcass ends 34a,34b around the bead assemblies 32a,32b. If the bead assemblies 32a,32b have an attached apex 52a, 52b, as shown in FIGS. 4, 5 and 8–12, this folding action continues until the bead apexes 52a,52b are pressed against the flange elements 54a,54b of the bead tube transfer device 28.

The carcass ends 34a,34b are maintained in this folded-up position by a vacuum which is imposed on the bead apexes 52a,52b through the perforated surface 56a,56b of the bead tube flanges 54a,54b, and radial vacuum rings 58a,58b which are mounted on the bead tube transfer device 28. Obviously, if there is no bead apex 52a,52b present, then the vacuum imposed through the perforated surface 56a,56b of the bead tube flanges 54a,54b will directly impinge on the folded-up carcass ends 34a,34b.

Figure 6:
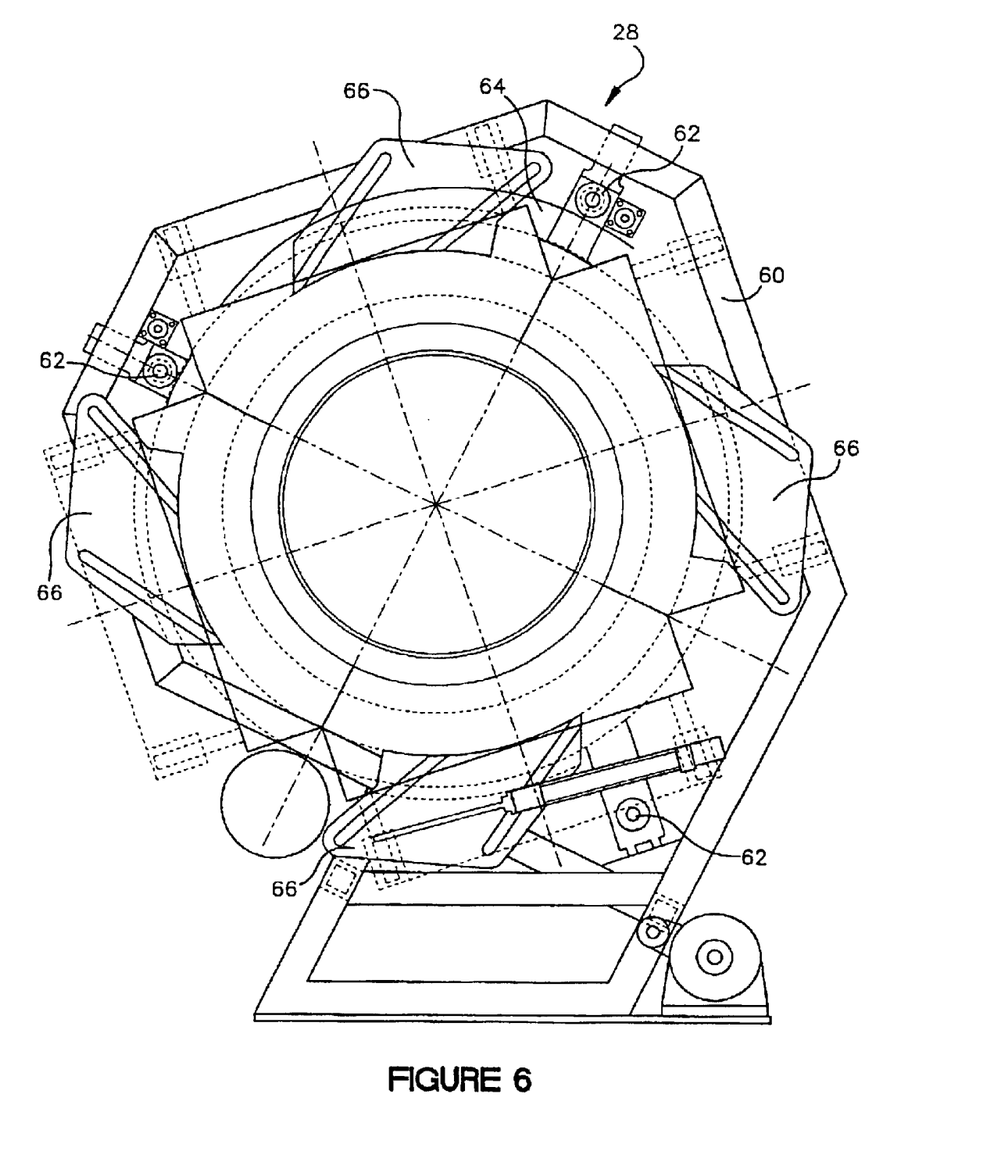
FIG. 6 is a transverse cross section of the bead tube transfer device.

As shown in FIG. 6, the bead tube transfer device 28 consists of a cage-like structure 60 equipped with three axial, linear bearings rails 62. These rails carry two main support rings 64, each one carrying four sets of dual radial linear bearing rails 66. Each set of dual radial rails 66 carries a portion of the carcass 30. The four sets of rails 66 combine to constitute one of the bead tube flanges 54a or 54b.

The four segments of a bead tube flange 54a or 54b are radially driven by a cam ring that is operated by a hydraulic piston. The two main support rings 64 are hydraulically connected so that all segments of the bead tube flanges 54a and 54b expand and collapse synchronously.

The main support rings 64 may be placed at varying axial separation distances in order to build up tire carcasses having different cord lengths. This capability is provided by mounting the main support rings 64 within the cage structure 60 on the axial, linear bearing rails 62. Motion is provided by interconnecting these rails with three, opposed thread ball screws which are themselves interconnected by a sprocket and chain drive. An electric motor drives the chains to adjust the width between the bead tube flanges 54a,54b, and thus a tire carcass's cord length.

Figure 7:
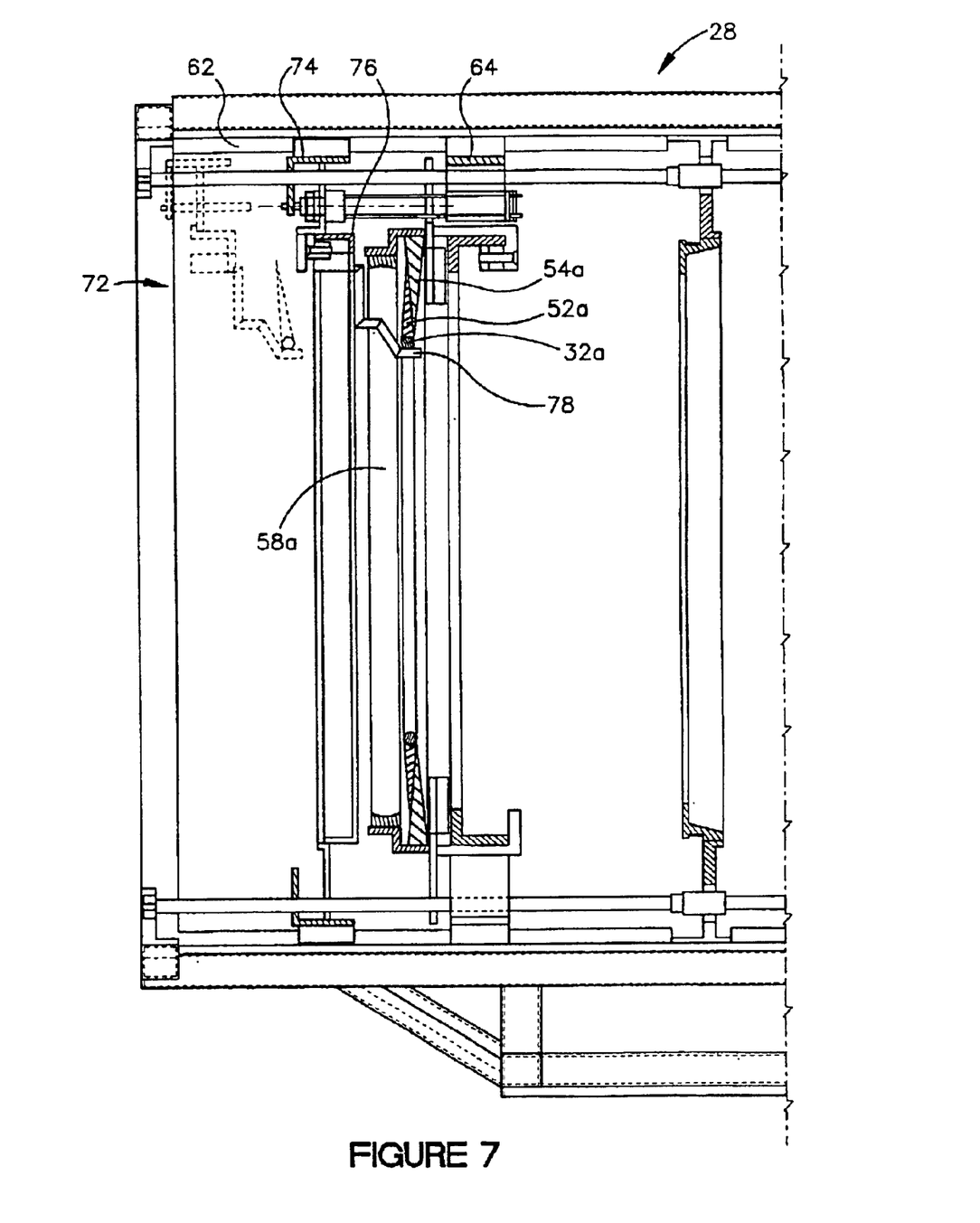
FIG. 7 is a transverse cross section of the bead tube transfer device's bead centering and loading device (one end shown)

The means for holding and placing the beads on a tire carcass is provided by a bead centering and loading device 72. As shown in FIG. 7, this loading device 72 consists of two carrier rings 74 (one shown), each of which positions on the carcass edges one of the beads 32a,32b, optionally with an attached apex 52a,52b. These rings 74 run on the same axial linear bearing rails 62 as the main support rings 64. The device 72 is connected to these rings 74 by hydraulic cylinders. These carrier rings 74 have mounted on them four radially swinging arms 76 (one shown), each of which is equipped with holding fingers 78 for beads 32a,32b. These arms 76 are interconnected by a cam ring that synchronizes their up and down swings, with the cam ring being driven by a pneumatic cylinder.

Operation of the bead centering and loading device 72 begins with the arms 76 in their collapsed, radially outward position so as to allow for good access to the band/carcass drum 22. A bead 32a,32b, optionally with an attached apex 52a,52b, is manually placed between the arms 76 which are then expanded radially inward to grasp and center the bead 32a,32b with respect to the axial centerline of the system 20. The rings 74 are then moved axially towards each other so as to place a centered bead 32a, 32b against the bead tube flanges 54a,54b located at either end of the bead tube transfer device 28. The beads are held there by magnets 80 mounted in the faces of both of the bead tube flanges 54a,54b. The arms 76 may then be collapsed and the rings 74 moved axially apart so as not to interfere with the subsequent tire building operations on the band/carcass drum 22.

After completion of the carcass end turn-up operation, the sections 38a–38h of the band/carcass drum 22 collapse and the tire carcass 30 is held in the bead tube transfer device 28 by the combined action of the magnets 80 and the vacuums imposed by the vacuum rings 58a,58b and the bead tube flanges 54a,54b. Next, the carcass is moved axially by the device 28 and into position for the operations of the shaping drum 24. When the carcass it placed above the shaping drum 24, both of its ends generally assume the position shown in FIG. 8.

As shown in FIGS. 9 to 12, the shaping drum 24 is equipped with specially configured bead clamp segments 82 which, in conjunction with the bead tube transfer device 28, ensure accurate axial positions of the beads 32a,32b during the shaping drum operations of bead clamping, carcass shaping and tire belt building.

Figures 8, 9, 10, 11:
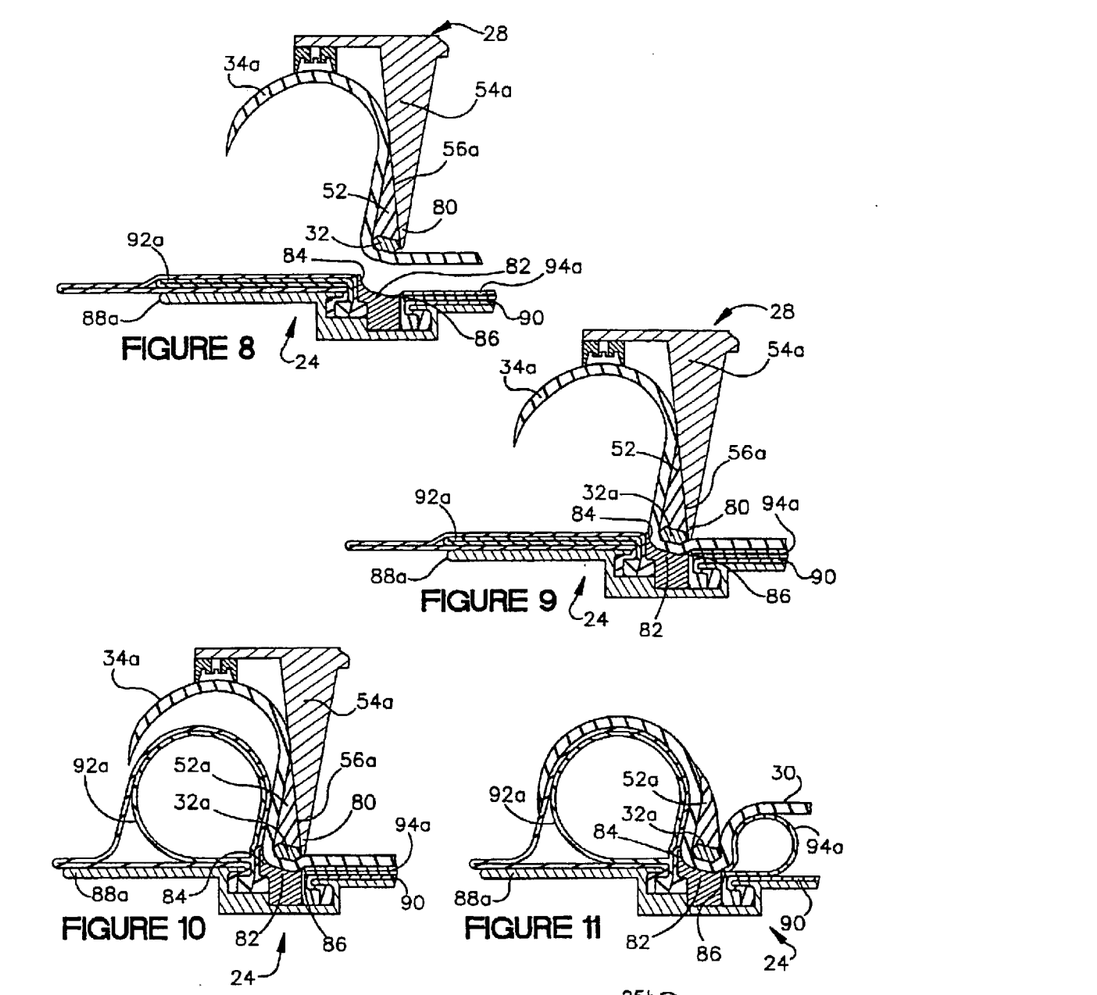
FIG. 8 is an enlarged partial section of the bead tube transfer device and the second stage, shaping drum, showing the bead clamps for receiving the tire beads set on the cylindrical tire carcass.
FIG. 9 is a section similar to that of FIG. 8 showing the tire beads of the cylindrical tire carcass in the bead clamps of the second stage, shaping drum.
FIG. 10 is a section similar to that of FIG. 9 showing an outer inflatable bladder for completing the turnups during the second stage operation.
FIG. 11 is a section similar to that of FIG. 10 but with the bead tube transfer device withdrawn and an inner bladder inflated for shaping the carcass and providing further support to prevent a bead from shifting axially inward during the second stage operations.

The bead clamp segments 82 are configured with a shoulder 84 on the outside and a lip 86 on the inside of the clamping surfaces. It is possible to configure these segments 82 in this manner because the carcass ends 34 have been already turned-up during the operations on the band/carcass drum 22, thus the bead clamp segments 82 configured in this manner, which, as shown in FIG. 9, approach the underside of the carcass and the beads by moving radially outward, will not gouge and tear the tire carcass. Instead, the shoulder 84 and lip 86, in conjunction with the bead tube flanges 54a,54b, form a pocket which positively determines the axial spacing of the beads 32a,32b.

To maintain this spacing after the bead tube flanges 54a,54b have contracted and been withdrawn, the outer shoulders 88a,88b of the shaping drum surface 90 include outer inflatable bladders 92a,92b. When these bladders 92a,92b are inflated, as shown in FIG. 10, they press inside the back side of the turned-up carcass ends 34a,34b and provide further support for the shoulder 84 to fix the outer axial position of the beads 32a,32b.

The shaping drum 24 also includes, mounted on the drum's outer surface 90 and on the inside of the bead clamp segments 87, inner inflatable bladders 94a,94b. When these inner bladders 94a,94b are inflated, as shown in FIG. 11, they provide further support for the segment lips 86 to prevent a bead 32a,32b from shifting axially inward during the initial carcass shaping phase. These inflated bladders 94a,94b push against a bead apex 52a,52b, respectively, and force it into the turned-up carcass outer edges 34a,34b.

Figure 12:
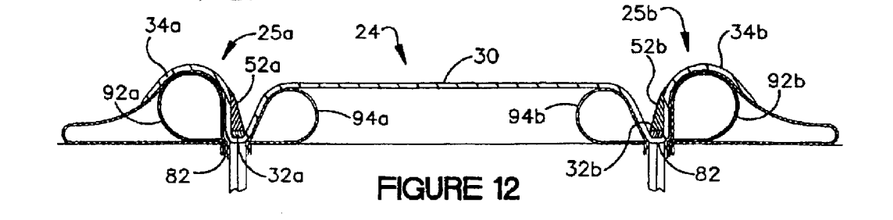
FIG. 12 is the top portion of a longitudinal cross section of the second stage, tire shaping drum with its bladders inflated for helping to lock the beads positions while shaping the carcass.

FIG. 12 provides a view of a portion of a longitudinal cross section of the second stage, tire shaping drum 24 with its bladders 92a,92b,94a,94b inflated for helping to lock the beads 32a,32b into the predetermined positions while shaping the carcass 30.

Thus, there has been described a unique, two-stage, precision method and apparatus for building a unvulcanized tire carcass which is suitable for molding a radial tire. Contrary to other, known two-stage methods, the first stage, band/carcass drum includes retractable end bells that cover the turn-up bladders to form an even, solid drum surface during a tire's first stage, component application operations. These end bells then retract to clear out of the way for the turning up of the carcass ends. This turning up action is further enhanced by the axial movement of the end bells as they push on cambered cams located beneath sections on which the bladders are mounted.

Similarly, the bead transfer device is unique in that: it provides the capability to adjust for different bead axial spacings so as to built tires having various cord lengths, it can handle carcasses, with its radial vacuum rings, in which sidewalls have been applied during the first stage of a tire's build—this being advantageous because their application is easier and more accurate on the solid, uniform band/carcass drum, and it provides, by use of its bead centering and loading device, for quicker and more accurate bead positioning and centering.

Additionally, the shaping drum is unique in that its specially configured, bead clamp segments work in conjunction with inflatable bladders act to provide for more accurate and stable bead positioning.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A system for building, in at least two stages, an unvulcanized tire carcass suitable for molding into a beaded, finished tire, the system comprising:

a first stage expandable drum on which unvulcanized tire building components are layered to form a cylindrically shaped, unvulcanized tire carcass having carcass ends, with an annular bead encompassing and placed proximate each carcass end;

the first stage drum having an inflatable bladder attached to opposite ends for turning up the respective carcass ends upon inflation;

a second stage shaping drum on which the unvulcanized tire carcass is shaped for subsequent molding and vulcanization, the shaping drum having two ends and bead clamping segments located proximate each of the shaping drum ends for clamping the beads of tire carcass so that the beads do not move and become misaligned during the tire building operations on the shaping drum; and a bead tube transfer device that transfers the shaped tire carcass and its beads between the first stage drum and the second stage drum while precisely maintaining the separation distance between the carcass' beads, the carcass ends being held in a turned up position during this transfer so as to allow the carcass and its beads to be clamped by the shaping drum bead clamping segments such that the beads' axial separation distance continues on the shaping drum to be approximately the same as that set on the first stage drum;

wherein the system is characterized in that:

the bead tube transfer device has at least two main support rings configured and oriented to circumferentially encompass the ends of a tire carcass, the rings being mounted so that their axial separation distance can be varied and set to a desired bead spacing distance;

bead tube flanges are circumferentially mounted on the rings, the bead tube flanges having a perforated axially-outer surface, the perforations allowing a vacuum to be imposed on a portion of the bead tube flange outer surface so as to aid in maintaining the carcass ends in a turned up position; and the bead tube flange outer surfaces have mounted thereon magnets for holding the beads proximate to the bead tube flanges;

the bead tube transfer device further has at least two circumferentially-mounted vacuum rings positioned axially outward of and approximately parallel to the bead tube flanges on the main support rings, the vacuum rings configured to encompass the turned up carcass ends of the tire carcass, and the vacuum rings imposing a vacuum on a portion of the carcass turned up ends so as to aid in maintaining the carcass ends in a turned up position; and the tire carcass is held in the bead tube transfer device with a fixed bead separation distance by the combined action of the magnets, and the vacuums imposed by the vacuum rings and the bead tube flanges.

2. The system of claim 1 further characterized in that:

the bead tube flanges that are attached to the main support rings are positioned for fixing axial position and separation distance of the beads.

3. The system of claim 1 further characterized in that:

the first stage drum has on each of opposite ends a retractable end bell that covers an inflatable turnup bladder while the unvulcanized tire components are being layered onto the drum, the end bell providing a smooth cylindrical surface upon which can be laid up the unvulcanized tire components used to build a tire carcass; and the end bells are mounted so as to allow for axial, retracting motion which serves to fully expose the inflatable turnup bladders so that the turnup bladders may operate to turn up the carcass ends.

4. The system of claim 3 further characterized in that:

cambered surface elements are pivotably mounted under the turnup bladders and arranged such that when the turnup bladders are inflated, axially moving the end bells inward causes the end bells to push on the cambered surfaces in a way that pushes the inflated turnup bladders to further fold the carcass ends around the beads.

5. The system of claim 1 further characterized in that:

the shaping drum has inner inflatable bladders mounted on an outer surface axially inside and proximate each bead clamping segment, and has outer inflatable bladders mounted on outer shaping drum surfaces axially outside and proximate each bead clamping segment; and when inflated, the inner bladders and the outer bladders work in conjunction with the bead clamping segments to prevent a tire's beads from moving and becoming misaligned during the tire building operations on the shaping drum.

6. The system of claim 1 further characterized in that:

the bead clamp segments on the shaping drum are configured with an axially outer shoulder, and an axially inner lip, both shoulder and lip extending radially outward from each bead clamp segment to form pockets for positively determining the axial spacing of the beads on the shaping drum.

7. The system of claim 6 further characterized in that:

the shoulder and lip on the bead clamp segments are shaped to work in conjunction with the bead tube flanges to form pockets for positively determining the axial spacing of the beads on the shaping drum.

8. The system of claim 1 further characterized in that:

the bead tube transfer device has integral bead centering and loading devices for placing beads on a tire carcass.

9. The system of claim 8 further characterized in that:

the bead tube flanges have been positioned relative to the first stage drum for fixing axial position of each bead relative to the tire carcass, and for fixing separation distance between the beads;

the bead centering and loading devices place a centered bead against a bead tube flange; and the beads are held in place by the magnets mounted in the faces of both of the bead tube flanges.

10. A method for building, in at least two stages, an unvulcanized tire carcass suitable for molding into a beaded, finished tire, the method comprising the steps of:

layering unvulcanized tire building components on a first stage drum to form a cylindrically cylindrically shaped, unvulcanized tire carcass having carcass ends;

placing a pair of tire beads in parallel relation around the first stage drum in spaced relation from the cylindrical tire carcass thereon, such that the carcass ends extend laterally beyond the tire beads, and the beads are placed in predetermined positions relative to the tire carcass, including a fixed predetermined bead separation distance;

expanding radially the first stage drum and the tire carcass thereon into engagement with the tire beads, and at least partially turning up the tire carcass ends around the tire beads to at least partially fix and lock the beads in place between the tire carcass and a bead tube transfer device;

transferring the tire beads and engaged tire carcass having at least partially turned up ends from the first stage drum to a second stage shaping drum having bead clamping segments, while maintaining the bead axial separation distance during the transfer and positioning of the beads and engaged carcass onto the second stage drum;

after positioning the beads and engaged carcass onto the second stage drum, clamping the tire beads on the second stage drum to maintain the bead axial spacing that was initially fixed on the first stage drum; and shaping the carcass on the second stage drum;

the method characterized by the steps of:

holding the tire beads and engaged tire carcass in the bead tube transfer device with a fixed, predetermined bead separation distance by the combined action of magnets acting on the beads, and vacuums holding the at least partially turned up carcass ends.

11. The method of claim 10 further characterized by:

configuring the bead clamp segments on the shaping drum with an axially outer shoulder, and an axially inner lip, both shoulder and lip extending radially outward from each bead clamp segment to form pockets for positively determining the axial spacing of the beads on the shaping drum.

12. The method of claim 10 further characterized by:

integrating the bead tube transfer device with bead centering and loading devices for placing beads on the tire carcass;

positioning flanges of the bead tube transfer device relative to the first stage drum for fixing axial position of each bead relative to the tire carcass, and for fixing separation distance between the beads;

using the bead centering and loading devices to place a centered bead against a bead tube flange; and holding the beads in place by the magnets that are mounted in the faces of both of the bead tube flanges.

13. The method of claim 10 further characterized in that:

the predetermined, unvulcanized tire building components layered on the first stage drum include a pair of sidewalls.

14. The method of claim 10 further characterized in that:

each tire bead has an unvulcanized apex attached thereto.

* * * * *